United States Patent Office 3,496,188
Patented Feb. 17, 1970

3,496,188
3-PYRAZOLYL-7-ARYLTRIAZOLYL COUMARINS
Wolf-Dieter Wirth, Cologne-Stammheim, Germany, assignor to Farbenfabriken Bayer Aktiengesellschaft, Leverkusen, Germany, a corporation of Germany
No Drawing. Filed May 24, 1966, Ser. No. 552,395
Claims priority, application Germany, June 12, 1965,
F 46,315
Int. Cl. C07d 99/02, 49/20, 55/04
U.S. Cl. 260—308          3 Claims

ABSTRACT OF THE DISCLOSURE

Brightening agents consisting essentially of 3-pyrazolyl-7-aryl triazolyl-coumarins and a method for brightening synthetic materials by treating with a dispersion or solution of the active agent.

The present invention relates to brightening agents; more particularly it concerns brightening agents which contain 3-pyrazolyl-7-aryltriazolyl-coumarin compounds of the general formula

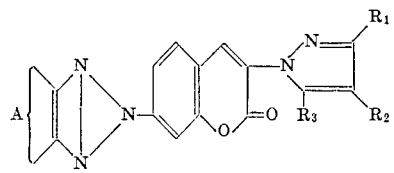

as active ingredient. In this formula $R_1$, $R_2$ and $R_3$, independently of one another, denote hydrogen or lower alkyl groups, such as methyl or ethyl groups, and A stands for an aromatic radical, for example, an optionally substituted phenylene, naphthylene or acenaphthylene radical; suitable substituents are, for example, halogen, cyano, alkyl and alkoxy groups, carboxylic acid and sulphonic acid groups or their esters, as well as carbonamide and sulphonamide groups, the nitro group being excepted.

The brightening agents of the present invention are suitable for the brightening of a great variety of materials chiefly for the brightening of fibres, filaments, fabrics, knitted fabrics or foils of synethetic origin, and especially for the brightening of materials of polyesters. They can be applied in the usual manner, for example, in the form of aqueous dispersions or in the form of solutions in inert organic solvents; if desired, they can also be used in combination with detergents or they can be added to casting materials serving for the production of foils or filaments. The amount of brightening agents required in each case can easily be determined by preliminary experiments; in general, amounts of 0.1–1% of the brightening agents, referred to the weight of the material to be treated, will be sufficient.

The 3-pyrazolyl-7-aryltriazolyl-coumarins to be used according to the invention as brightening agents can be obtained, for example, for example, by condensing 4-acetylamino-salicylidene-aniline of the formula

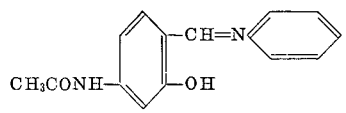

with pyrazolyl-1-acetic acids of the formula

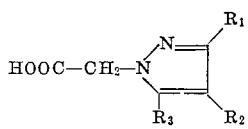

in which $R_1$, $R_2$ and $R_3$ have the same meaning as above, to give 3-pyrazolyl-7-acetylamino-coumarins of the formula

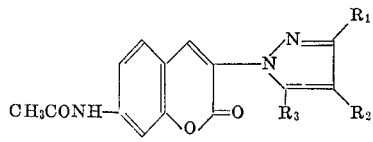

hydrolysing the resultant acetylamino compounds to form the free amines, diazotising the latter, reacting the resultant diazonium salts with primary aromatic amines which couple in the ortho-position to the primary amino group, and oxidising the resultant o-aminoazo dyestuffs to form the corresponding triazole compounds.

The following examples serves to illustrate the invention without, however, limiting its scope; the parts given are parts by weight.

EXAMPLE

A fabric of polyester fibres is padded with an aqueous solution containing, per litre, 1 g. 3-pyrazolyl-7-naphthotriazolyl-coumarin, 2 g. of a commercial dispersing agent and 1 g. of a commercial wetting agent. The fabric is then squeezed to a weight increase of 100%, dried and heated at 180° C. for 20 seconds. Compared with untreated fabric, the fabric thus treated exhibits a strong brightening effect of very good fastness to light.

The 3-pyrazolyl-7-naphthotriazolyl-coumarin used as brightening agent is prepared in the following manner:

127.6 parts 4-acetylamino-salicylidene-aniline, 75.0 parts pyrazolyl-1-acetic acid, 49.0 parts anhydrous sodium acetate and 255 parts acetic anhydride are heated with stirring and reflux cooling for 5 hours. 26.9 parts of the 3-pyrazolyl-7-acetylamino-coumarin so obtained are then heated with reflux cooling in a mixture of 220 parts glacial acetic acid and 50 parts concentrated hydrochloric acid for 30 minutes, and the resultant 3-pyrazolyl-7-aminocoumarin hydrochloride is diazotised after cooling the reaction solution to 0–5° C. A solution of 14.3 parts 2-naphthylamine in 20 parts glacial acetic acid is then added to the diazonium salt solution while stirring; the mixture is subsequently adjusted to a pH value of about 4 by the dropwise addition of a concentrated sodium hydroxide solution and further stirred at room temperature for a few hours. The azo compound formed is filtered off, washed with water, dired and suspended in 500 parts pyridine. The suspension is mixed with 60 parts copper acetate, heated under reflux at boiling temperature for 10 minutes and then cooled. The precipitated 3-pyrazolyl-7-naphthotriazolyl-coumarin is filtered off, washed with water and recrystallised from dimethyl formamide; it has melting point 271–272° C.

Instead of 3 - pyrazolyl - 7-naphthotriazolyl-coumarin, one of the following 3-phenyl-7-aryltriazolyl-coumarin compounds can also be used as brightening agents:

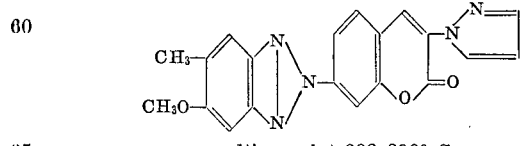

melting point 288–290° C.

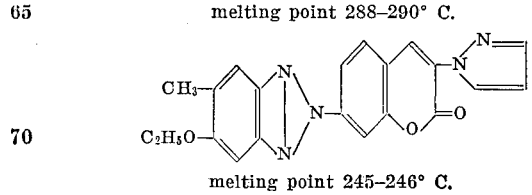

melting point 245–246° C.

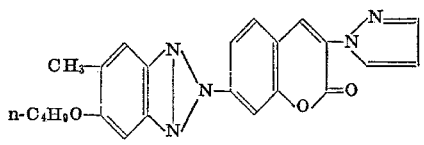

melting point 206–209° C.

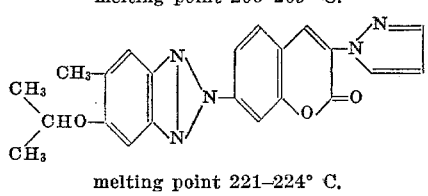

melting point 221–224° C.

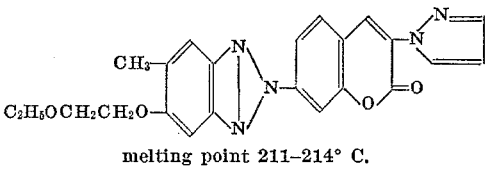

melting point 211–214° C.

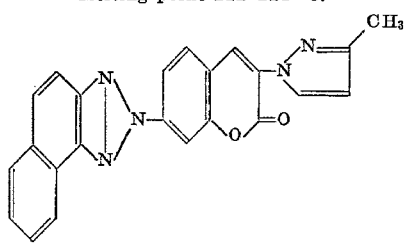

melting point 291–293° C.

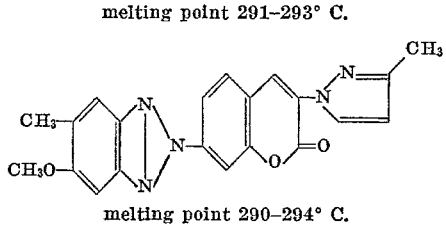

melting point 290–294° C.

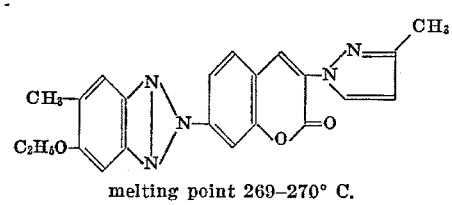

melting point 269–270° C.

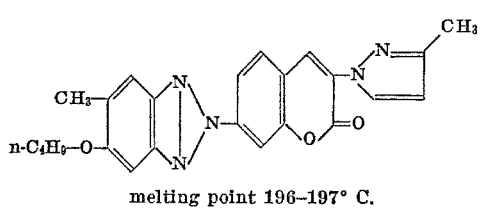

melting point 196–197° C.

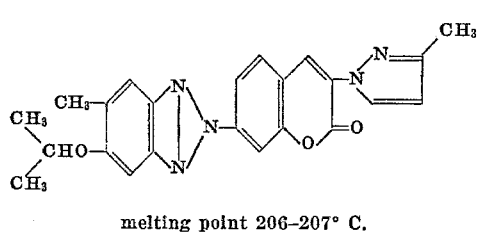

melting point 206–207° C.

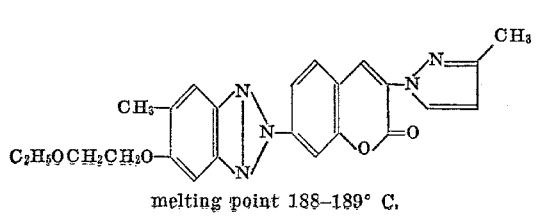

melting point 188–189° C.

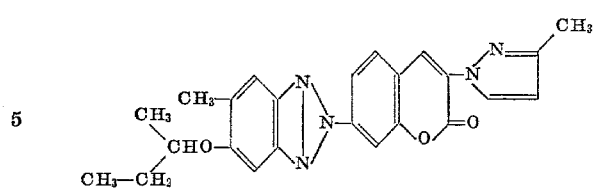

melting point 186–188° C.

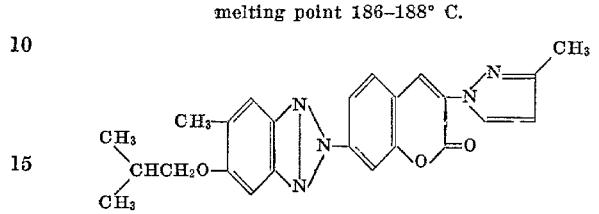

melting point 224–225° C.

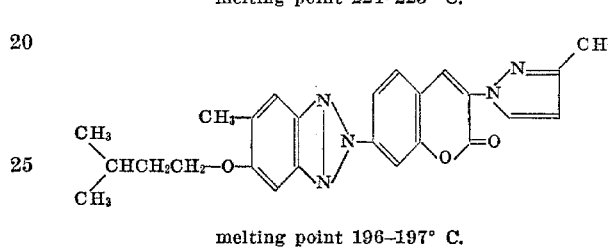

melting point 196–197° C.

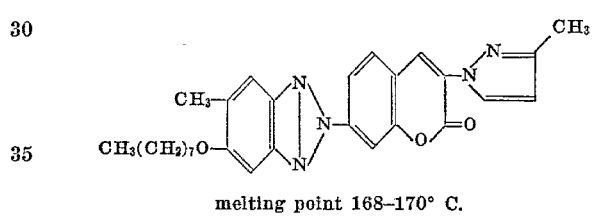

melting point 168–170° C.

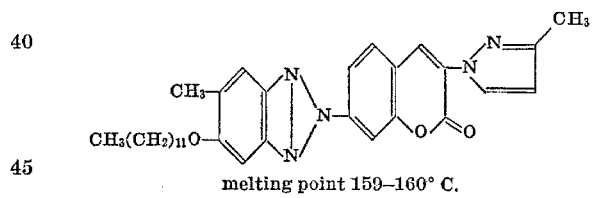

melting point 159–160° C.

These compounds can be obtained by using in the process of production described in the above example, instead of the 3-pyrazolyl-7-amino-coumarin obtained from 4-acetylamino-salicylidene-aniline and pyrazolyl-1-acetic acid, the 3-(3'-methylpyrazolyl)-7-amino-coumarin obtainable from 4-acetylamino-salicylidene-aniline and 3-methylpyrazolyl-1-acetic acid, and as coupling component, instead of 2-naphthylamine, 1-methyl-2-methoxy-4-aminobenzene, 1-methyl-2-ethoxy-4-aminobenzene, 1-methyl-2-n-butoxy-4-aminobenzene, 1-methyl-2-i-propoxy-4-aminobenzene, glycol-monoethyl-mono(2-methyl-5-amino)-phenyl ether, 1-methyl-2-sec.-butoxy-4-aminobenzene, 1-methyl-2-i-butoxy-4-aminobenzene and 1-methyl-2-i-amyloxy-4-aminobenzene.

I claim:
1. A compound of the formula
wherein

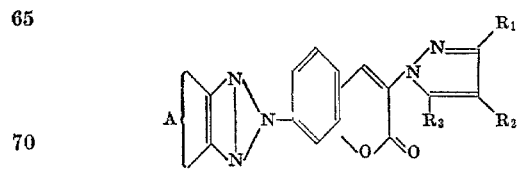

$R_1$, $R_2$ and $R_3$ are independently defined as hydrogen or lower alkyl; and A is the residue of a phenyl, naphthyl or the corresponding substituted components containing as substituents a member selected from the group consisting of halo, cyano, carboxy, sulfo, lower alkyl, alkoxy having 1-12 carbon atoms, lower alkoxy lower alkoxy; said residue being condensed with the triazo moiety.

2. The compound of claim 1 wherein $R_1$ is hydrogen or lower alkyl and $R_{2-3}$ are hydrogen and A is naphthyl.

3. A compound of claim 1 wherein $R_{1-3}$ are individually defined as hydrogen or lower alkyl; and A is a lower alkyl-alkoxy-substituted phenyl residue.

References Cited

UNITED STATES PATENTS 3,288,801  11/1966  Fleck et al. _____ 260—308

ALTON D. ROLLINS, Primary Examiner

U.S. Cl. X.R.

252—301.2; 260—310, 562